(12) United States Patent
Krumnow

(10) Patent No.: US 6,957,696 B1
(45) Date of Patent: Oct. 25, 2005

(54) COMBINATION RADIANT AND FORCED AIR CLIMATE CONTROL SYSTEM

(76) Inventor: Mark J. Krumnow, 10360 S. Justin Dr., Oak Creek, WI (US) 53154-6537

( * ) Notice: Subject to any disclaimer, the term of this patent is extended or adjusted under 35 U.S.C. 154(b) by 293 days.

(21) Appl. No.: 10/426,572

(22) Filed: Apr. 30, 2003

Related U.S. Application Data

(63) Continuation-in-part of application No. 09/769,860, filed on Jan. 25, 2001, now Pat. No. 6,575,233.

(51) Int. Cl.$^7$ .......................... F24F 3/00; G05D 23/00
(52) U.S. Cl. .................... 165/208; 165/212; 165/223; 165/267; 236/1 B; 236/1 C; 236/91 C; 236/91 F; 454/258; 237/2 R; 237/2 A
(58) Field of Search .................... 165/205, 208, 165/209, 212, 240, 267, 268, 217, 223; 236/49.3, 236/1 R, 1 B, 1 C, 91 R, 91 C, 46 R, 37, 236/36, 78 B, 91 F, 10, 11, 9 R, 5 A; 454/256, 454/229, 258; 237/2 R, 2 A, 8 R; 700/276, 700/277, 299, 300; 340/500, 501, 505

(56) References Cited

U.S. PATENT DOCUMENTS

| | | | | |
|---|---|---|---|---|
| 3,567,115 A | * | 3/1971 | Nelson | 236/1 B |
| 3,838,733 A | | 10/1974 | Erlandson | 165/215 |
| 4,100,428 A | * | 7/1978 | Delisle et al. | 236/91 E |
| 4,174,064 A | * | 11/1979 | Pratt, Jr. | 236/1 B |
| 4,293,092 A | | 10/1981 | Hatz et al. | 237/12.1 |
| 4,335,320 A | * | 6/1982 | Garver | 165/207 |
| 4,381,075 A | * | 4/1983 | Cargill et al. | 700/276 |
| 4,387,763 A | | 6/1983 | Benton | 165/29 |
| 4,483,388 A | | 11/1984 | Briccetti et al. | 165/2 |
| 4,582,249 A | * | 4/1986 | Nelson | 165/209 |
| 4,687,050 A | | 8/1987 | Podlipnik | 165/27 |
| 4,882,908 A | * | 11/1989 | White | 165/233 |
| 4,918,933 A | | 4/1990 | Dyer | 62/79 |
| 4,931,948 A | * | 6/1990 | Parker et al. | 165/208 |
| 4,971,136 A | | 11/1990 | Mathur et al. | 165/1 |
| 5,161,608 A | * | 11/1992 | Osheroff | 165/208 |
| 5,181,653 A | * | 1/1993 | Foster et al. | 165/209 |
| 5,244,146 A | * | 9/1993 | Jefferson et al. | 236/11 |
| 5,245,835 A | * | 9/1993 | Cohen et al. | 165/208 |
| 5,259,445 A | * | 11/1993 | Pratt et al. | 165/12 |
| 5,280,422 A | * | 1/1994 | Moe et al. | 700/23 |
| 5,294,051 A | * | 3/1994 | Piegari | 236/91 E |
| 5,361,982 A | * | 11/1994 | Liebl et al. | 236/46 R |
| 5,405,079 A | | 4/1995 | Neeley et al. | 237/2 B |
| 5,488,218 A | | 1/1996 | Olsen et al. | 219/492 |
| 5,531,377 A | * | 7/1996 | Thayer et al. | 236/91 C |
| 5,552,998 A | * | 9/1996 | Datta | 700/286 |

(Continued)

*Primary Examiner*—Ljiljana Ciric
(74) *Attorney, Agent, or Firm*—Andrus, Sceales, Starke & Sawall, LLP

(57) ABSTRACT

A method and controller for controlling the operation of a zoned climate control system including a primary heat source, a secondary heat source, a cooling unit, and a humidifier unit. The controller is configured to receive both heating demand signals and cooling demand signals from a plurality of zone thermostats positioned throughout the residence. Upon receiving a heating demand signal, the controller operates the primary heat source to provide heat to the zone issuing the heating demand signal. The controller determines whether the primary heat source satisfies the heating demand signal within a maximum heating period. If the heating demand is not satisfied within this period, the controller activates the secondary heat source to supplement the heat being supplied by the primary heat source.

14 Claims, 11 Drawing Sheets

U.S. PATENT DOCUMENTS

| | | | |
|---|---|---|---|
| 5,607,014 A | * | 3/1997 | Van Ostrand et al. ...... 165/240 |
| 5,622,221 A | * | 4/1997 | Genga et al. ............... 165/208 |
| 5,701,750 A | * | 12/1997 | Ray ........................... 236/1 B |
| 5,718,372 A | | 2/1998 | Tishler ....................... 236/11 |
| 5,775,581 A | | 7/1998 | Welden ..................... 237/8 R |
| 5,918,668 A | | 7/1999 | Trimble ..................... 165/240 |
| 5,950,709 A | | 9/1999 | Krueger et al. ............ 165/11.1 |
| 5,967,411 A | | 10/1999 | Perry et al. ................. 237/2 B |
| 6,062,455 A | * | 5/2000 | Giannuzzi et al. ........... 227/10 |
| 6,073,690 A | | 6/2000 | Raley ......................... 165/241 |
| 6,122,603 A | * | 9/2000 | Budike, Jr. ................. 702/182 |
| 6,311,105 B1 | * | 10/2001 | Budike, Jr. ................. 700/291 |

* cited by examiner

COMBINATION RADIANT AND FORCED AIR CLIMATE CONTROL SYSTEM

CROSS-REFERENCE TO RELATED APPLICATION

The present application is based on and claims priority to U.S. patent application Ser. No. 09/769,860, filed on Jan. 25, 2001, issued as U.S. Pat. No. 6,575,233 on Jun. 10, 2003.

BACKGROUND OF THE INVENTION

The present invention relates to a controller and method of operating a climate control system including a primary and a secondary heating and cooling source with humidity control. More specifically, the present invention is a controller and method of providing heating and cooling to a zoned residence or building, from a primary source of heat, such as a radiant heating system, and a secondary source of heat, such as a forced air HVAC system. The HVAC system preferably provides primary and secondary cooling as well as humidity control.

Many small businesses and homes utilize a zoned radiant heating system to heat the individual zones during periods of cold outside temperatures, such as during the winter months. In a radiant heating system, a supply of heated water is distributed through a series of heat exchanging pipes positioned throughout the heating zone. For example, a radiant heating system can include radiant floor pipes and baseboard mounted radiators which transfer heat from the supply of heated water to the open environment being controlled.

In a zoned radiant heating system, a controller receives heating demand signals from individual zone thermostats and controls the operation of the main boiler, injection system, a number of water circulators and series of zone controlling devices such as valves or circulators to supply the heated water from the boiler to the individual zones requiring heat. Although radiant heating systems are effective at maintaining a very constant temperature within a heating environment, radiant heating systems often suffer from the inability to quickly heat a room upon a sudden demand for heat, such as when the outside temperature drops dramatically, when the radiant heating system is initially turned on, or when a window has been left open and the temperature within one of the heating zone drops dramatically.

In a small business or residence that utilizes radiant heating, a forced air HVAC system that includes a full zone venting infrastructure and numerous zone dampers to control the flow of air into the zones is installed to provide air conditioning. The HVAC forced air system includes its own separate controller that receives cooling demand signals from the zone thermostats such that the forced air controller controls the operation of the chiller and the opening and closing of the zone dampers to provide cooling to the residence as required. Typically, the control unit for the forced air HVAC system is separate from the control unit for the radiant heating system. Since the controllers of the two systems operate independently, the combined climate control system includes a switch that allows the homeowner to select either the heating and cooling functions.

In a residence or small businesses that has both a radiant heating system and a forced air HVAC system, the forced air HVAC system is used exclusively for cooling. Although it is used only for cooling in this type of application, the forced air HVAC system can also include a heat source to provide heat to the residence. Since radiant heating is a more preferred type of heat, the HVAC forced air system normally does not utilize the forced air heating capabilities. One primary reason for this is the inability for the forced air controller to communicate and coordinate the heating function with the controller for the radiant heating system.

As discussed above, one draw back of a radiant heating system is the inability of the radiant heating system to quickly elevate the temperature in the building to the desired temperature upon a sudden demand for heat. Although the radiant heating system is able to elevate the temperature in a building a few degrees in an acceptable amount of time, situations which require a large temperature rise require an increased amount of time compared to a forced air heating system.

Therefore, it is an object of the present invention to provide a controller that is capable of simultaneously operating both a radiant heating system and a forced air HVAC system based on signals received from a series of zone thermostats. Further, it is an object of the present invention to operate the combined radiant and forced air HVAC systems in a manner such that the forced air system is used to supplement the heat provided by the radiant system when the radiant system is unable to meet the heating demand within a preselected time period. In addition, it is an object of the present invention to operate both the primary and secondary heating and cooling systems, along with humidity, from one thermostat per zone. Further, it is an object of the present invention to provide a controller that allows zones within a facility to be designated as radiant-only and receive heating while other zones in the same building are simultaneously receiving cooling.

SUMMARY OF THE INVENTION

The present invention is a controller for a climate control system that includes a primary heat source and a forced air system that provides a secondary heat source, primary and secondary cooling, and humidity control. The controller of the present invention controls the operation of the primary heat source, the secondary heat source and the cooling unit such that the single controller can operate the three separate systems in an efficient manner to control the temperature within a residence or small business.

The controller of the present invention is operatively connected to the primary heat source and operates the primary heat source to provide heat to the residence. Preferably, the primary heat source is a zoned radiant heating system that utilizes a supply of heated water to independently heat each of the zones based upon a heat demand signal from a zone thermostat. The controller of the present invention is coupled to the boiler, a plurality of water circulators and a zone control devices such as a valve or circulator for each zone such that the controller can selectively divert the supply of heated water to any zone issuing a heat demand signal.

In addition to its connection to its primary radiant heating system, the controller of the present invention is connected to a secondary heat source. In the preferred embodiment to the invention, the secondary heat source is a forced air HVAC system. The forced air HVAC system includes both a heating and a cooling unit such that the forced air system can supply both cooled and heated air to each of the zones in the residence. The forced air HVAC system includes a plurality of zone dampers that can be opened and closed by the controller to divert the heated or cooled air from the forced air system into the selected zones. Additionally, the forced air system can include a humidifier controlled by the controller of the present invention. Thus, the controller of the present invention can supply humidity to selected zones within the residence.

The forced air system of the preferred embodiment can also preferably include an operable vent or damper that allows make-up air (fresh air) into the forced air system. The controller of the present invention includes a vent terminal such that the controller can issue a signal to the vent to open the vent or damper any time a demand signal is applied to the forced air system, whether for cooling or heating.

In accordance with the present invention, the controller initially operates the radiant heating system to satisfy any heat demand signal received from one of the zones. Upon supplying heated water from the radiant heating system to a zone demanding heat, the controller monitors the continuous period of time a heat demand signal is generated from that zone. If the primary, radiant heating system is unable to satisfy the heat demand signal within a field selected period of time, the controller activates the secondary forced air heating system to supplement the heat being supplied by the primary heating system. The period between activation of the primary heat source and the secondary heat source is selectable by the user.

The controller of the present invention also controls the operation of the cooling unit within the forced air system. If any one of the individual zones generates a cooling demand signal, the controller activates the first condenser coil in the cooling unit and the circulating fan for the forced air system. Upon activation of the cooling unit, the controller monitors the continuous amount of time a cooling demand signal is received from that zone. If the continuous period of time the cooling demand signal is generated exceeds a preselected time period, the controller activates a supplemental cooling source, such as a secondary condenser coil in the cooling unit, to aid in cooling the individual zone requesting cooling.

As described above, the controller of the present invention is able to simultaneously control the operation of a primary heat source and a secondary heat source such that the secondary heat source can be operated to supplement the heat being supplied by the primary heat source. According to the invention, the primary heat source is preferably a radiant heating system, while the secondary heat source is a forced air system that also includes a cooling unit. Thus, the single controller of the present invention is able to coordinate the operation of two otherwise independent heating systems such that the heating systems can operate effectively together to provide the most efficient, comfortable, and effective heating of the zones in a residence.

The controller of the present invention further includes a set of positionable switches each assigned to one of the zones such that an operator can designate each of the zones to be either a forced air and radiant (FAR) zone or a radiant-only (R) zone. During normal operations, if the controller of the present invention receives a demand for heat from a zone designated as a radiant-only (R) zone, the controller can activate the primary radiant heating system to supply heat to the radiant-only zone. If the demand for heat persists for longer than the predetermined period, the controller will not activate the secondary heating system, since the zone calling for heat is a radiant-only zone.

If the controller of the present invention is operating in a cooling mode and thus supplying cooled air from the forced air system to one of the zones, the controller will prevent the activation of the primary, radiant heating system upon receipt of a heating demand signal from any zone designated as a forced air and radiant (FAR) zone. However, the controller of the present invention allows for the supply of heat from the primary, radiant heating system to be supplied to an R zone even when the controller is operating in a cooling mode and supplying cooled air from the forced air system to one of the other zones designated as a FAR zone. This feature of the present invention allows the controller to simultaneously supply heat and cooling to different zones, such as supplying heat to a basement during the summer while supplying cooling to the remaining zones on the upper floors. This allows the controller to heat the basement floor, for example, to reduce the damp, musty environment while at the same time cooling the upper floors.

The controller of the present invention further includes operating terminals to control the operation of a high velocity forced air system's heating circulator. The high velocity forced air system functions as the secondary heating system. Upon receiving an extended duration demand for heat, the controller of the present invention activates the high velocity circulator. Once heated water is supplied to the high velocity system, the high velocity system is able to provide a source of heated forced air for the secondary heating system. The controller of the present invention eliminates the need for a separate controller for controlling the operation of the high velocity circulator.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
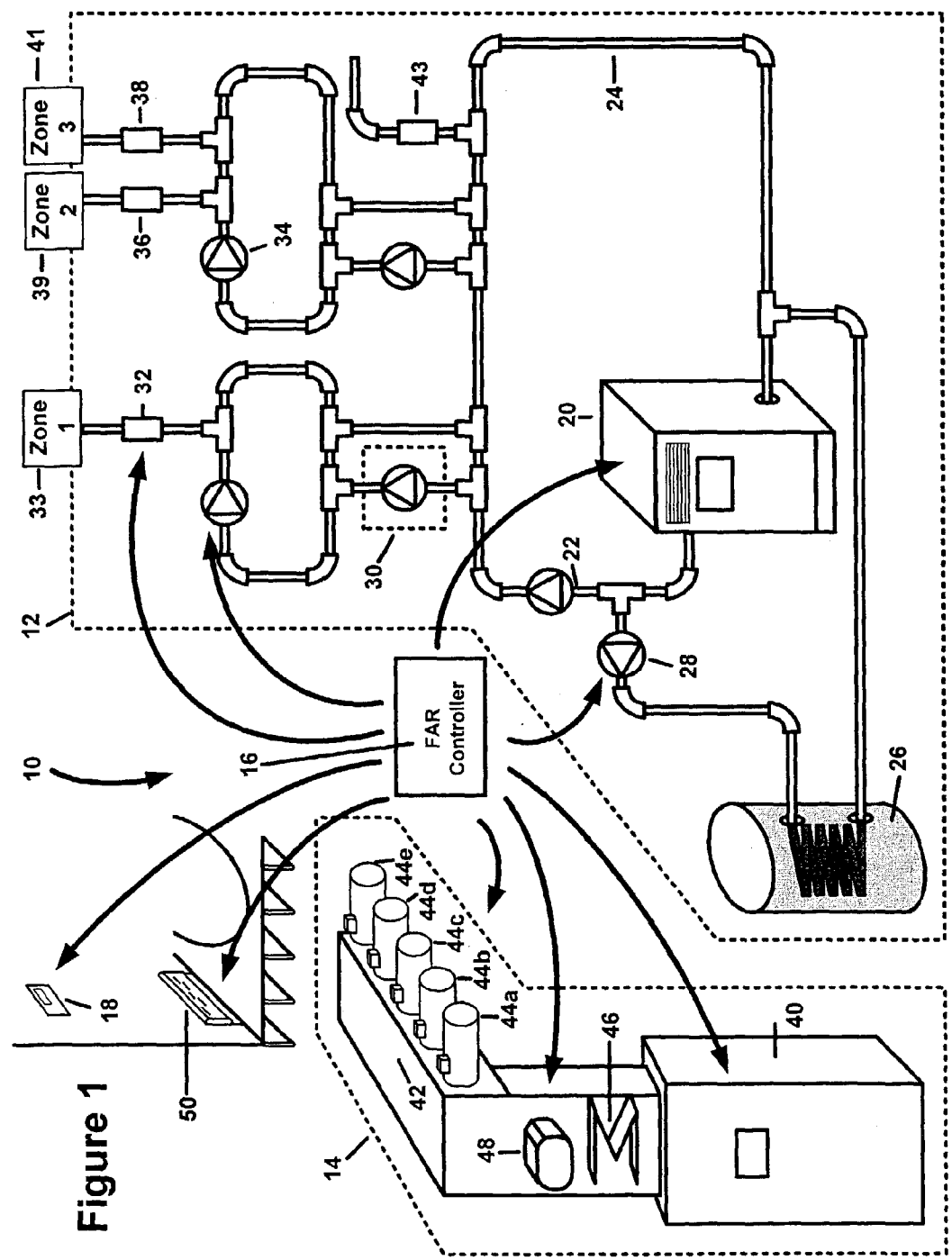
FIG. 1 is a schematic illustration of the controller of the present invention and its connections to a forced air HVAC system and a radiant heating system for a residence.

Referring first to FIG. 1, thereshown is a climate control system 10 of the present invention for a residence or small business. The climate control system 10 of the present invention includes a primary radiant heating system 12 and a forced air HVAC system 14. Both the radiant heating system 12 and the forced air HVAC system 14 are zoned systems that have the ability to independently provide heating and/or cooling to a plurality of individual zones. It should be understood that each zone is typically a room or group of rooms in the residence or small business.

In accordance with the present invention, both the radiant heating system 12 and the forced air HVAC system 14 are controlled and operated by a single controller 16. The single controller 16 is also connected to a plurality of individual single stage zone thermostats 18 that allow the occupants to set a desired temperature for the individual zone. The zone thermostats 18 each generates a heating demand signal or a cooling demand signal based upon the temperature within the individual room. These heating and cooling demand signals are relayed to the controller 16 such that the controller 16 can control and operate either or both the radiant heating system 12 and/or the forced air HVAC system 14, depending upon the type of signal received.

In the preferred embodiment of the invention illustrated in FIG. 1, the radiant heating system 12 functions as the primary heat source for the climate control system 10. The radiant heating system 12 includes a boiler 20 or other hot water source that is operable to heat the water used in the radiant heating system 12. As illustrated in FIG. 1, the controller 16 will send a heat demand signal to operate either an injection system and/or a boiler 20.

Heated water from the boiler 20 flows from the boiler 20 through a supply pipe 22 that connects to a closed circulation system that finally returns the supply of water to the boiler 20 through the return pipe 24. The closed loop can be configured in any number of manners, and the specific configuration shown in FIG. 1 is for illustrative purposes only and it should be understood that a variety of other configurations can be used while operating within the scope of the present invention.

In FIG. 1, the boiler 20 provides heated water to an indirect hot water heater 26 through a priority zone valve/circulator 28. In the preferred embodiment in the invention shown in FIG. 1, the indirect hot water heater 26 and the zone valve/circulator 28 are designated a priority heating zone such that when the indirect hot water heater 26 calls for heat, the controller 16 opens the priority zone valve/circulator 28 while closing the zone valves/circulator for the remaining heating zones. In this manner, when the indirect hot water heater 26 demands heat, the entire supply of heated water from the boiler 20 is provided to the indirect hot water heater 26. This priority over the heating zones lasts for a specified time period. After the time period has expired, the priority is removed.

In the embodiment of the invention illustrated in FIG. 1, the boiler 20 supplies heated water to a first zone 33 through a circulator 30 and a zone valve/circulator 32. For example, when the zone thermostat 18 in the first zone 33 calls for heat, the controller 16 operates the circulator 30 and opens the zone valve/circulator 32 to supply heated water to the zone 33.

The radiant heating system 12 further includes a second circulator 34 and a pair of zone valves/circulators 36 and 38. The zone valves 36 and 38 are used to control the supply of heated water to a second zone 39 and a third zone 41 in the climate control system. In accordance with the present invention, the controller 16 can be configured to control up to five individual zones or one priority zone and four individual zones, although only three are shown in FIG. 1. As can be understood in FIG. 1, the various control connections between the controller 16 and the individual zone valves/circulators, secondary circulators and the boiler or injection system allow the controller 16 to operate the radiant heating system 12 and provide the required heating to each zone.

In FIG. 1, a supplemental valve/circulator 43 is shown connected to the primary loop. The valve/circulator 43 can be used to control the flow of heated water to a supplemental heater, as will be described below.

In addition to connections to the radiant heating system 12, the controller 16 is operatively connected to the forced air HVAC system 14, including a forced air heater 40. The forced air heater 40 is a conventional gas, electric, or high velocity furnace that provides heated air to a circulating fan (not shown) that directs the heated air through a supply manifold 42. The supply manifold 42 is shown connected to five individual zone dampers 44a–44e. Each of the zone dampers can be opened or closed to allow the flow of heated air to enter into an individual zone associated with the damper. The zone dampers 44a–44e are controlled by the controller 16 in a manner to be described in detail below.

In addition to controlling the forced air heater 40, the controller 16 controls the primary and secondary coils of a forced air cooling unit 46 and a humidifier 48. The circulating fan of the forced air HVAC system 14 is controlled by the controller 16 and is used to circulate the cooled air through the zone dampers 44a–44e to each of the individual zones.

In addition to connections to the radiant heating system 12 and the forced air HVAC system 14, the controller 16 can also be connected to a supplemental heater 50 positioned in any one of the first two zones. In the embodiment of the invention illustrated in FIG. 1, the supplemental heater 50 is an electric baseboard or hot water heater used to provide additional heat to one of zones during high heat demands. The operation of the controller 16 in controlling and operating both the radiant heating system 12 and the forced air HVAC system 14 will be discussed in much greater detail below.

Figure 2:
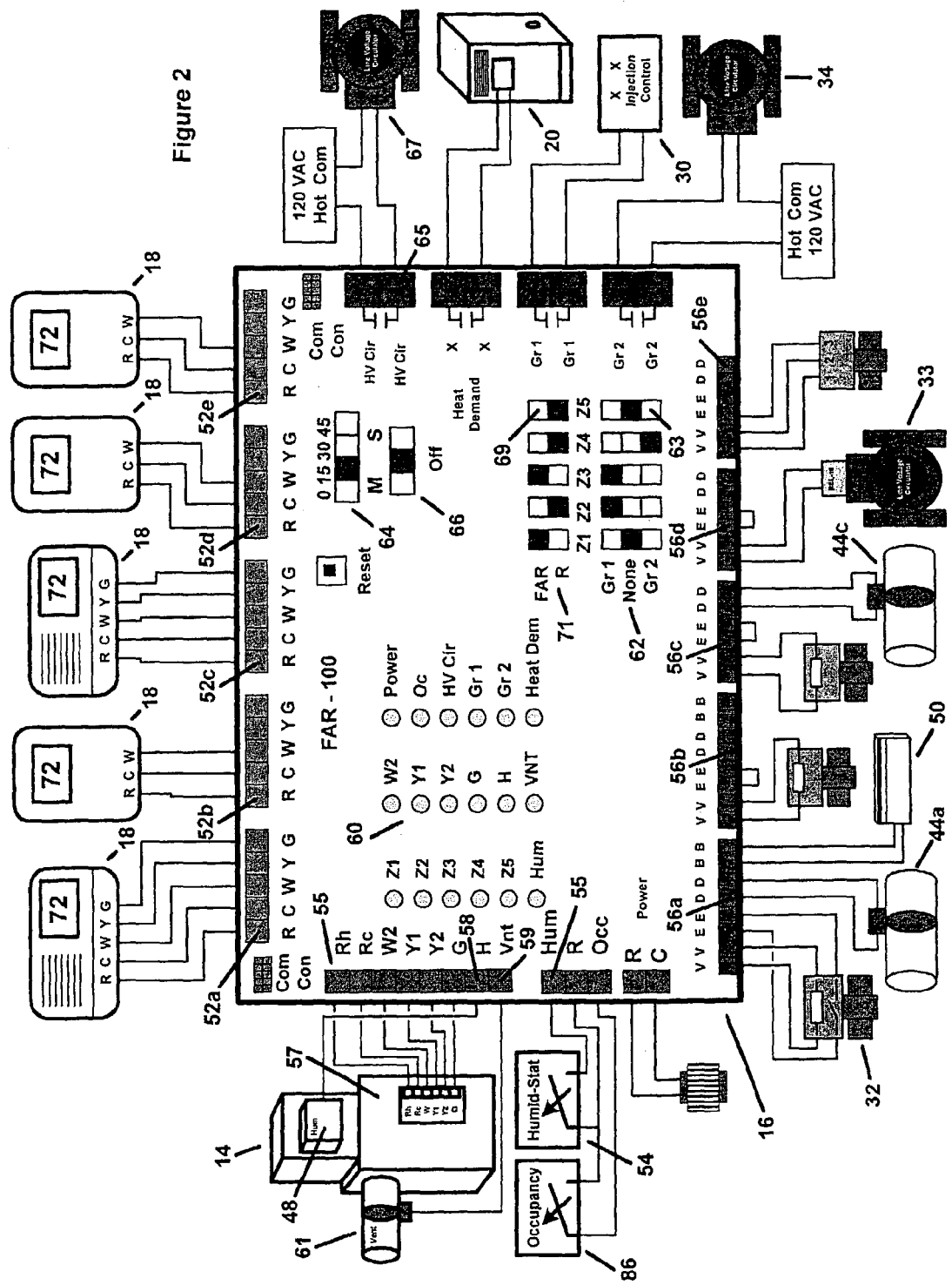
FIG. 2 is a schematic illustration of the controller layout and its connections to various components in the zoned climate control system.

Referring now to FIG. 2, thereshown is a schematic illustration of the controller 16 of the present invention. The controller 16 generally includes five thermostat input blocks 52a–52e. Each one of the thermostat input blocks 52a–52e receives electronic control signals from a zone thermostat 18 that is associated with one of the individual zones. As discussed previously, the controller 16 of the present invention is capable of controlling five individual zones simultaneously. It should be understood that the controller could be configured to control less than or greater than five zones while still operating within the scope of the present invention.

In general, each of the thermostat input blocks 52a–52e is identical in nature. In the embodiment illustrated in FIG. 2, a humidistat 54 provides a humidity signal to the controller. The humidity signal received at terminal 55 allows the controller 16 to selectively operate the humidifier 48 contained in the forced air HVAC system 14.

The controller 16 also includes five output terminal blocks 56a–56e, each of which corresponds to one of the five zones controlled by the controller 16. Each of the output terminal blocks 56a–56e controls the operation of the valves/circulator and dampers for each zone. Each output terminal block includes four contacts for a typical zone valve 32 or two contacts for a typical zone circulator 33. A pair of the contacts allow the controller 16 to open and close the zone valve 32, while a second pair of the connections allow the controller 16 to receive a signal from the end switch of the zone valve 32 indicating that the zone valve has reached its fully opened or fully closed end positions. These connections between the zone valve 32 and the controller 16 are conventional connections used in currently available radiant heating systems. When the device is connected to a zone circulator, only two contacts are used to energize the circulator. The controller is not waiting for a fully on signal from the circulator.

In addition to the connections to the zone valve 32 or circulator, each of the output terminal blocks 56a–56e includes a pair of connections to the zone damper for the specific heating zone being controlled, such as the zone damper 44a shown in FIG. 2. In this manner, the controller 16 is able to open and close the zone damper 44a depending upon the system requirement.

In the embodiment of the invention illustrated in FIG. 2, the output terminal blocks 56a and 56b include a pair of additional connections for operating a supplemental heater 50, such the electric or hot water baseboard heater in FIG. 2. Although only output terminal blocks 56a and 56b include these additional connections, it is contemplated by the inventor that any number of the five output terminal blocks 56a–56e could include these additional connections.

As illustrated in FIG. 2, the controller 16 includes connections to the boiler 20 and an injection demand system or a pair of circulators 30 and 34. In this manner, the controller 16 can control the radiant heating system by turning on and off the boiler 20, injection demand system or activating the circulators 30 and 34.

The controller 16 includes a forced air terminal block 55 that allows the controller 16 to control operations of the forced air heating and cooling unit 57. The forced air terminal block 55 includes a humidity terminal 58 that allows the controller 16 to operate the humidifier 48 included in the forced air HVAC system described previously.

The controller 16 further includes a vent terminal 59 that allows the controller to control the operation of a vent or damper 61 associated with the forced air heating and cooling unit 57. The vent 61 is selectively opened by the control unit 16 to allow make-up air (fresh air) in whenever the forced air heating and cooling unit 57 is activated. The vent terminal 59 provides a signal to the vent 61 to open or close the vent 61 as desired.

The controller 16 includes a high velocity circulator terminal block 65 that provides an electrical connection to a high velocity circulator 67. In general, the high velocity circulator 67 provides a method to move hot water, provided by the boiler 20, to a hot water coil in a high velocity system. The high velocity system 67 provides a high velocity source of heated air to any one of the zones selected. The heated water from the boiler 20 is passed through a heat exchanger over which a high velocity flow of air is passed. The flow of air that passes over the heat exchanger is then supplied to the desired heating zone in a conventional manner. As will be described in detail below, in order for the high velocity circulator 67 to provide heat, the boiler 20 must first be actuated in order to supply heated water. The controller 16 of the present invention provides the control of both the high velocity circulator 67 and the activation of the boiler 20 in one, complete unit as compared to the prior systems that require two separate controllers.

In addition to the various terminal connections included on the controller 16, the controller 16 includes a series of display elements that allow a homeowner to monitor the current status of the controller 16 at any time during the operation of the controller 16. The controller 16 includes a series of LED's 60 that display the current heating or cooling demand of the individual zones Z1–Z5 one color for heating and another color for cooling, a humidity demand, and all of the forced air outputs, power, occupancy, as well as the four radiant outputs. The radiant outputs are the high velocity circulator, heat demand and both grouping outputs. The activation of each of the LED's in the display 60 allows the occupant of the home to determine the current operating status of the controller 16. For example, if the LED next to the display Z1 is illuminated a specific color for heat, along with the LED next to the heat demand label, the controller is indicating that zone one is currently demanding heat and the heat demand contact is closed. Further, if the LED next to primary cooling (Y1) is illuminated, this illumination indicates that primary cooling is currently active.

The controller 16 further includes a grouping selection panel 62. The grouping selection panel 62 includes a three position selection switch 63 for each of the zones Z1 through Z5. Each zone can independently select either group 1, group 2, or none. The grouping switches are each set based upon similar system demands. These dry contact grouping outputs can be used as a heat demand for the injection system 30, or to control a secondary circulator 34, depending upon how the system is configured. As shown in FIG. 2, group 1 is selected for both zones two (Z2) and three (Z3) while group 2 is selected for zone four (Z4). Zones one (Z1) and five (Z5) do not have a grouping circulator selected (none), so their zone could be connected directly to the primary loop as in baseboard heat.

The controller further includes a time delay selector 64 that is field selected for the time delay between activation of the secondary heating or cooling after the primary heating or cooling device has been energized. As shown in FIG. 2, the time delay selector 64 is a four position switch that allows the time delay between such activation to be 0, 15, 30, 45 minutes depending upon the user selection. The selector switch 64 position indicates which of the delays has been chosen.

The control unit 16 also includes a priority master/slave selector 66. The master/slave selector allows the user to select whether the aquastat priority is connected to the control unit 16, allowing it to become a master controller. If the aquastat is connected to another controller, then all the remaining controllers must be put in slave mode. If no aquastat priority is used, then all controllers should be put in the OFF position.

Figure 3:
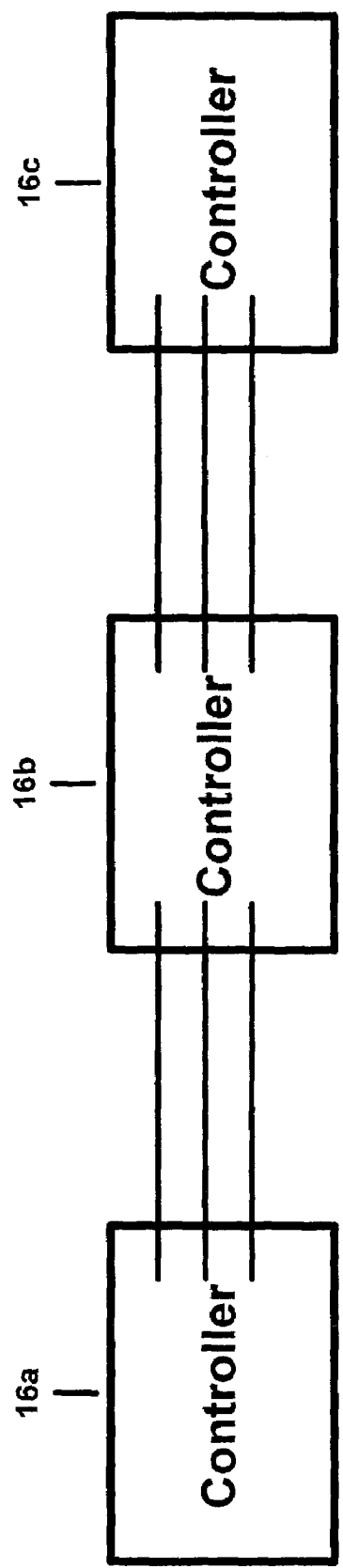
FIG. 3 is a schematic illustration of the interconnections between multiple controllers.

As shown in FIG. 3, multiple control units 16a–16c can be connected and operate as an integrated control unit. Since each of the individual controller 16 is capable of controlling only five zones at a time, multiple controller 16a–16c can be joined together to simultaneously operate and control larger numbers of zones. For example, the control system in FIG. 3 with three controllers 16a–16b is capable of controlling up to fifteen individual zones or one priority zone and fourteen zones. If all of the controllers 16 are heating/cooling zones, then the priority switch 66 is set to OFF. If the climate control system has a priority zone, then the controller 16 that is connected to the priority aqua-stat is set to MASTER where all of the other controllers 16 in FIG. 3 are set to SLAVE.

Since the controllers 16a–16c can operate as multiple controllers, FIG. 3, communications are established between all of the boards. If none of the zones are currently calling for either heating or cooling, then the first zone, of any of the controllers 16a–16c, that calls for either heating or cooling sets the mode for the entire climate control system. The heating or cooling mode is not changed until all of the other zones with the same type of demand is satisfied. Once that mode is satisfied, if another zone wants the opposite mode, then the controller 16a–16c can change modes. As an example, if zone 14 is the first zone to call for either heating or cooling, and is calling for heating, then all zones that require heat must be satisfied before any zones that need cooling can be satisfied.

When the occupied input 86 goes from unoccupied to occupied, the controller immediately activates the primary and secondary heating or cooling demand independent of the time delay 64 selection, as will be described below.

Referring back to FIG. 2, the controller 16 includes a zone selection panel 69. The zone selection panel 69 includes a two-position selection switch 71 for each of the zones Z1 through Z5. Each zone can be independently designated as either a forced air and radiant zone (FAR) or a radiant-only zone (R). As shown in FIG. 2, zone 2 (Z2), zone 4 (Z4) and zone 5 (Z5) are selected as radiant-only (R) zones while zone 1 (Z1) and zone 3 (Z3) are selected as forced air and radiant (FAR) zones. If a zone is selected as a radiant-only zone, the controller will supply heat to the zone only through the primary, radiant heating system. Typically, such a zone may be included in the basement of a building since the basement may be divided into multiple zones where only one of the zones is used to supply forced air. As will be described in greater detail below, the controller 16 of the present invention operates to supply heat to any one of the radiant-only zones even when one of the forced air and radiant zones is receiving cooling.

Referring now to FIGS. 4–11, the detailed operational sequence performed by the control unit 16 in operating both the radiant heating system 12 and the forced air HVAC system 14 will now be described.

Figure 4:
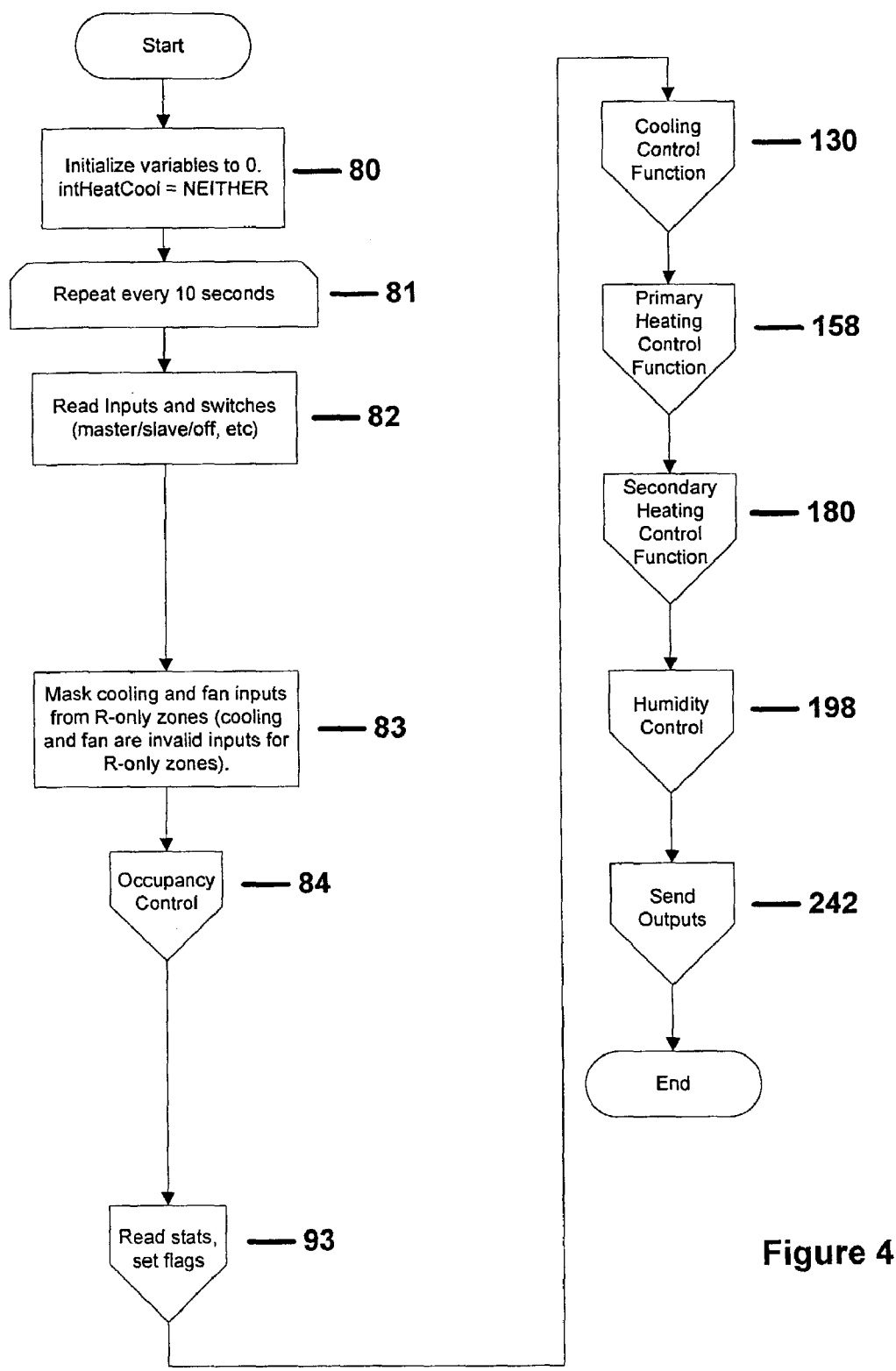
FIG. 4 is a flow chart illustrating the general operating sequence preformed by the controller of the present invention.

Referring first to FIG. 4, when the controller 16 is initially activated, the controller 16 initializes the system variables and sets the heat/cool flag to a NEUTRAL value, as indicated in step 80. After the heat/cool flag has been set, the controller 16 reads the input ports and individual switches on the controller 16 as indicated in step 82. For example, the controller determines whether the controller has been set as a master or slave, reads the time delay value, determines all of the zones grouping selections and determines whether each zone is a radiant-only or forced air and radiant zone. The inputs are read preferably every ten seconds, as indicated by step 81.

After reading the inputs, the controller masks any cooling and fan inputs received from radiant-only zones, since cooling and fan inputs from these zones are invalid. As was illustrated in FIG. 2, the heating source selection panel 69 allows each of the zones to be selected as either a radiant-only (R) zone or a forced air and radiant (FAR) zone.

Figure 5:
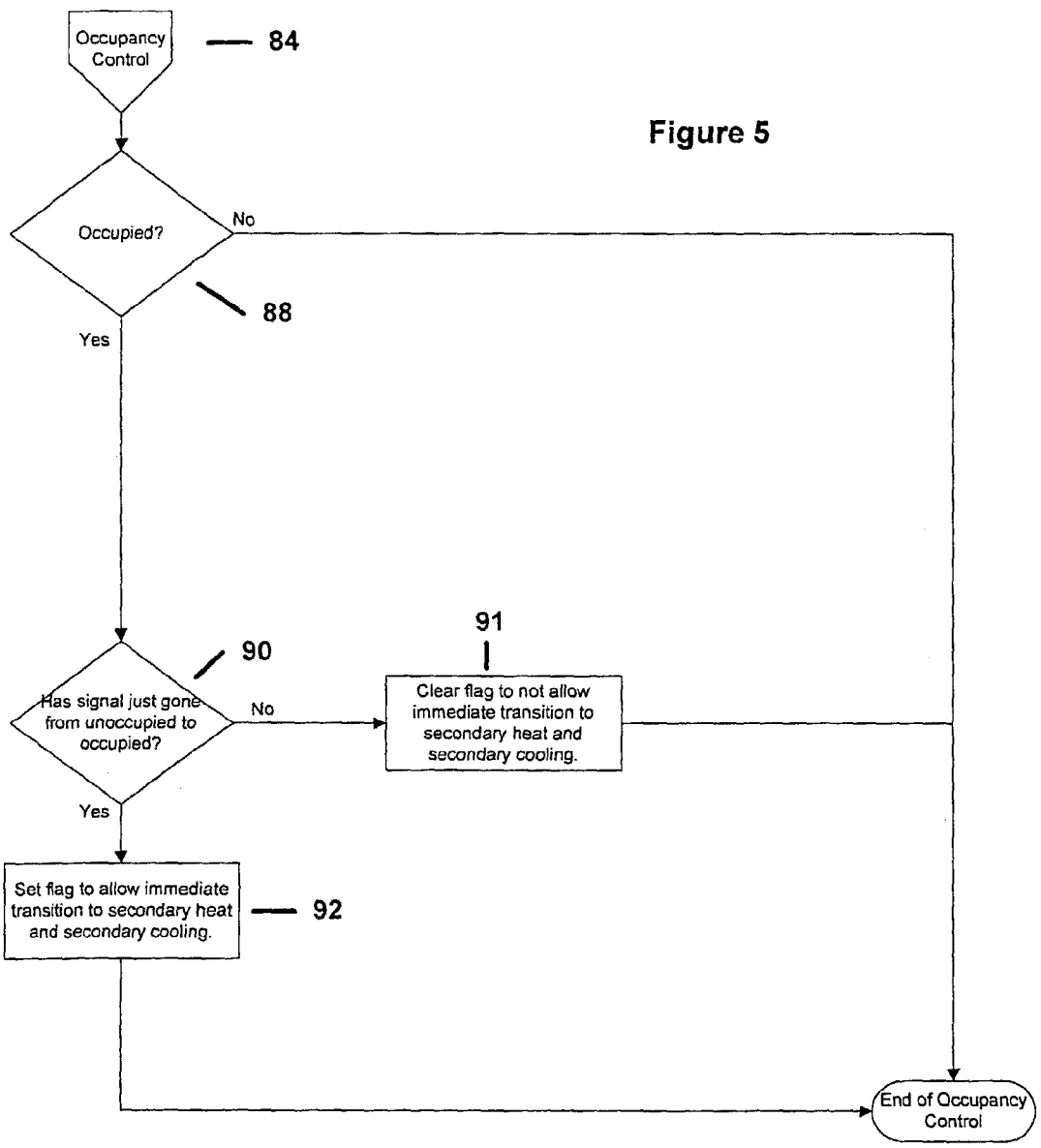
FIG. 5 is a flow chart illustrating the occupancy control sub-routine performed by the controller of the present invention.

After reading the configuration switches, the controller 16 enters into the occupancy control sub-routine 84, which is illustrated in FIG. 5. In the occupancy control sub-routine, the controller 16 interrogates the occupancy control switch 86 connected to the controller 16, as illustrated in FIG. 2. Based upon the position of the occupancy control switch 86, the controller 16 determines whether the residence is occupied in step 88. If the residence is unoccupied, the occupancy control sub-routine ends and the controller returns back to the main flow sequence of FIG. 4.

However, if the occupancy control switch 86 indicates that the residence is occupied, the controller 16 determines whether the occupancy signal has just gone from unoccupied to occupied, as illustrated in step 90. If the signal has just switch from unoccupied to occupied, the controller 16 sets a flag which allows the controller 16 to immediately transition to the secondary heating or cooling source, which is the forced air HVAC system 14, as illustrated in step 92. Since the residence is now occupied, the controller 16 is configured to allow both the radiant heating system 12 and the forced air heat HVAC system 14 to simultaneously supply heat to the residence in order to quickly bring each of the zones to desired temperature. If the controller is in cooling, example summer mode, then both the primary and secondary cooling stages of the HVAC system 14 are activated without the time delay. After setting the flag in step 92, the occupancy control sub-routine is ended and the controller 16 returns to its main flow sequence illustrated in FIG. 4.

If the occupancy control switch 86 has been in the occupied position for at least two time samples in a row, the controller 16 clears the indicator flag, and establishes the time delay between the primary and secondary systems for all zones with new demands. After clearing the flag in step 91, the occupancy control sub-routine is ended and the controller returns to its main flow sequence illustrated in FIG. 4.

Figure 6:
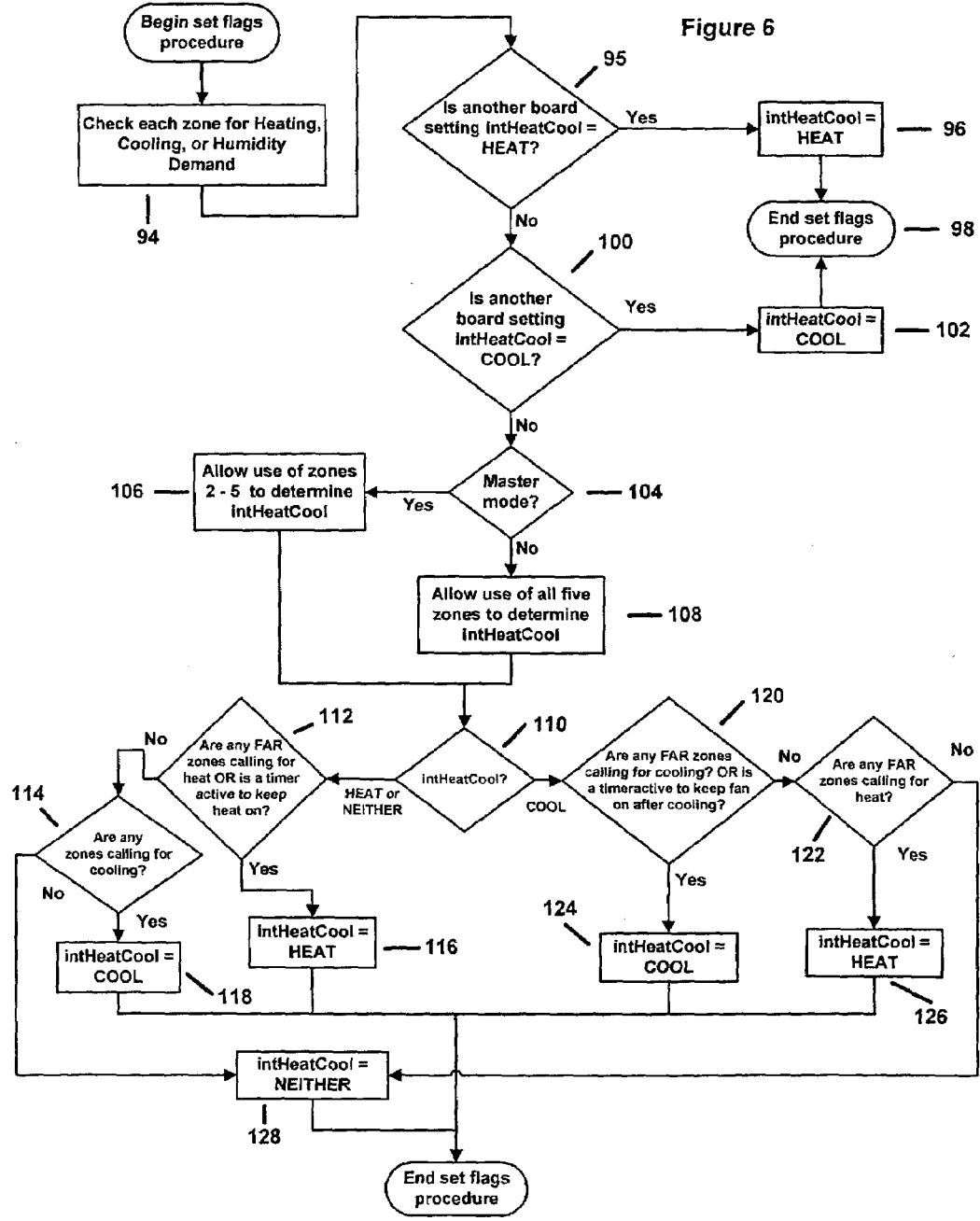
FIG. 6 is a flow chart illustrating the initialization sub-routine performed by the controller of the present invention.

As illustrated in FIG. 4, the next step in the main flow sequence is for the controller 16 to begin a sub-routine to analyze for heating/cooling/humidity demand signals from individual zone thermostats connected to the controller 16, as illustrated by step 93 and the sub-routine of FIG. 6. Initially, the controller 16 checks for an input signal from each zone to determine whether the zones are calling for heat, cooling or humidity, as shown in step 94. After reading these inputs, the controller 16 determines whether another controller coupled to the present connected controllers 16a–16c has set the heat/cool flag set to the heat value, as illustrated in step 95. If another of the controllers is currently calling for heat, the heat/cool flag is set to HEAT as illustrated in step 96 and the set flags sub-routine is ended, as illustrated in step 98 and the controller returns to the main flow sequence illustrated in FIG. 4.

However, if the heat/cool flag has not been set to HEAT, the controller determines whether the heat/cool flag has been set to COOL by one of the other connected controllers 16a–16c. If one of the controllers currently requires cooling in one of its zones, the heat/cool flag set to COOL, as illustrated in step 102, and the set flags sub-routine is ended 98 and the controller returns to the main sub-routine.

If the coupled controllers 16a–16c are not calling for either heating or cooling, the controller 16 next determines whether the controller is in the master mode, as illustrated in step 104. If the controller is in the master mode, zone one is the priority heating zone and zones two to five are used to set the heat/cool flag, as illustrated in step 106. However, if the controller is not in the master mode, the controller can use all five of the zones to determine the heat/cool flag value, as illustrated in step 108.

Next, the controller determines in step 110 whether the heat/cool flag is set to HEAT or COOL. If the heat/cool flag is set to HEAT or is NEUTRAL, the controller determines whether any FAR zones are calling for heat/heat timer on or cooling, as illustrated in step 112 and 114. Based upon whether these FAR zones are calling for heating/heat timer or cooling, the controller sets the heat/cool flag accordingly, as illustrated in steps 116 and 118. After setting the heat/cool flag, the controller 16 ends the sub-routine and returns back to the main flow diagram of FIG. 4.

If the heat/cool flag is currently set to COOL, as determined in step 110, the controller determines whether any FAR zones are calling for heat or cooling/cool timer on, as illustrated in step 120 and 122, and sets the heat/cool flag accordingly, as illustrated in step 124 and 126. If the zones are calling for neither heating or cooling, the heat/cool flag is set to NEUTRAL in step 128 and the controller returns to the main routine illustrated in FIG. 4.

Figure 7:
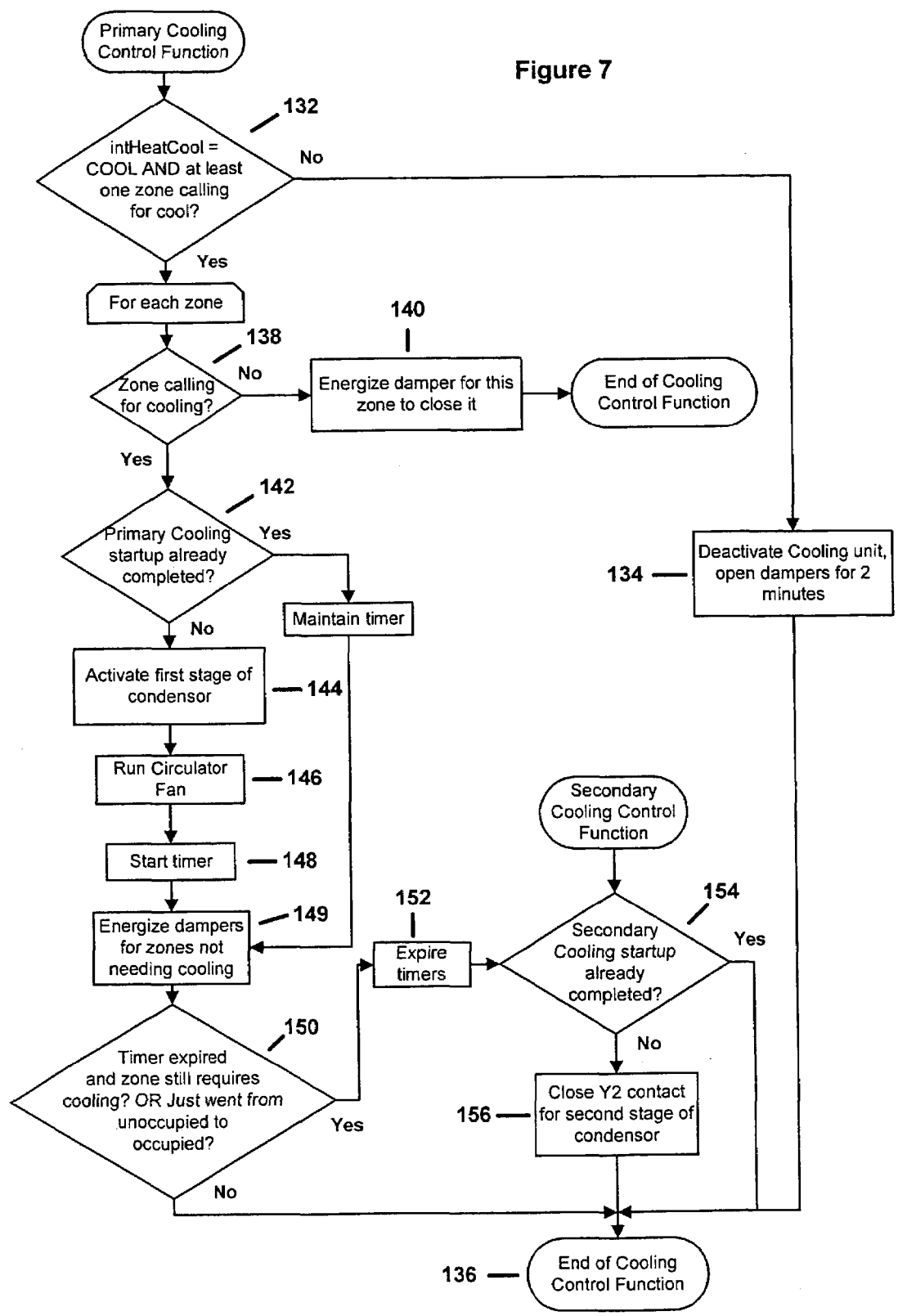
FIG. 7 is a flow chart illustrating the cooling control sub-routine performed by the controller of the present invention.

As illustrated in FIG. 4, once the stats and flags have been read and set, the controller 16 enters into a cooling control function 130. Cooling control sub-routine is illustrated in FIG. 7 and initially the controller 16 determines whether the heat/cool flag is set to COOL and at least one zone is calling for cooling. If the flag is not set to COOL and at least one zone is not calling for cooling, the controller deactivates the cooling unit 46, waits two minutes and opens all of the zone dampers 44a–44e in step 134 and ends the cooling control function in step 136. As can be understood in step 134, the controller 16 opens each of the zone dampers 44a–44e whenever cooling or heating is not required from the forced air HVAC system 14.

In step 132, if the controller determines that the heat/cool flag is set to COOL and at least one of the zones designated as a forced air and radiant (FAR) is calling for cooling, the controller interrogates each of the zones to determine whether the zone is calling for cooling in step 138. If a zone is not calling for cooling, the zone damper for that zone is closed, as illustrated in step 140. However, if the FAR zone is calling for cooling, the controller determines in step 142 whether the primary cooling has already begun. The primary cooling consists of a primary cooling coil included in the cooling unit 46 of the forced air HVAC system 14. If the primary cooling startup has not yet been completed, the controller activates the first stage of the condenser, begins to run the circulating fan, starts a timer and closes the dampers of the zones not needing cooling, as illustrated in step 144–149.

The timer illustrated in step 148 is used by the control unit 16 to determine whether the first stage of the cooling condenser has provided the required cooling in a preselected amount of time. Referring back to FIG. 2, the controller 16 includes a time delay selector 64 that indicates that the timer can be set for either 0, 15, 30 or 45 minutes. If the controller 16 determines that the first stage of the condenser is unable to cool one of the zones to the desired temperature within the delay period, as illustrated in step 150, the controller resets the timer in step 152 and activates a secondary cooling sequence, as illustrated in step 154. The secondary cooling calls for the controller 16 to activate the second stage of the cooling unit 46, as illustrated in step 156. In this manner, the controller 16 is able to activate additional cooling capacity to satisfy the cooling demand of each zone after a predetermined delay set by the user.

In addition to determining whether the timer has expired in step 150, the controller 16 will activate the secondary cooling capacity of the forced air HVAC system when the occupancy switch 86 in FIG. 2 has just gone from unoccupied to occupied. In this manner, the controller 16 is able to quickly bring the temperature within the zones to the desired value when the residence goes from an unoccupied state to an occupied state.

After the cooling control function 130, the control unit enters the primary heating control function 158, as illustrated in FIG. 4. During the primary heating control function 158, as specifically shown in FIG. 8, the controller first determines whether each of the individual zones is calling for heat, as illustrated in step 160. If an individual zone is not calling for heat, the controller 16 de-energizes the zone valve in block 162 and resets the delay timer for that zone, as illustrated in block 164. After the delay timer is reset in block 164, the controller returns to the main operational flow chart.

However, if one of the zones is calling for heat, as determined in step 160, the controller determines whether primary heat can be supplied to that zone due to the priority function. As discussed previously, the master controller is connected to the priority circuit, which in FIG. 1 includes the indirect water heater 26. As discussed previously, if the indirect water heater 26 of the priority zone demands heat, the controller will not supply heat from the primary radiant heating system to the heating zones, even though the zone is calling for heat. This step is illustrated in block 166.

In step 166, the controller also determines whether the heat/cool flag is set to COOL. If the flag is set to COOL and the FAR/R status of the zone is set to FAR, then the controller cannot operate a heating function until the cooling demand is satisfied. Further, the controller determines the FAR/R status of the zone in step 166.

If primary heat is not allowed in step 166, the controller de-energizes the zone valve for the particular zone in step 168 and begins the timer, as illustrated in step 170. If the priority zone is called, a one hour priority timer is started. If the one hour priority zone timer expires and the heating demand of the priority zone is not satisfied, then the priority control over the other zones are disabled and the priority zone is treated just like a normal heating zone.

If primary heat is allowed to the individual zone, the zone valve for that zone is energized, as illustrated in block 172. Energization of the zone valve allows heated water from the radiant heating system to flow to the zone demanding heat.

It is important to note that if the priority zone is preventing the primary radiant heating system from supplying heat to each of the zones, the controller is able to supply heat to the zones through the secondary, forced air system after the time delay. This feature allows the controller to provide heat to each zone while maintaining the priority function for up to one hour in the present embodiment.

After the zone valve has been energized in step 172, the timer is started in step 170. Additionally, step 170 resets the timer to zero if the zone is no longer requiring heat. Step 170 determines how long heat has been demanded from the primary radiant heating system by any of the individual heating zones. As discussed previously, the timer is used to set a delay between operation of the primary heat source and the secondary source. In FIG. 2, the time delay selector 64 illustrates the four delay periods available for the controller 16. In the embodiment of the invention illustrated in FIG. 2, the delay can be 0, 15, 30 or 45 minutes. However, it should be understood that various other delay values could be used while operating within the scope of the invention.

Referring back to FIG. 8, the controller determines in step 174 whether the timer has expired and the FAR heating zone still requires heat or if the control unit was just switched from unoccupied to occupied. If this has happened, the controller expires the timer in block 176 and sets the secondary heating flag to indicate that the particular heating zone requires secondary heat, as shown in step 178. Thus, if a individual heating zone requires heat for longer than the delay period set by the user or the unoccupied input just went to occupied, the controller sets a flag indicating that secondary heat is required for that heating zone. In this manner, the control unit is able to supply a secondary source of heat to a heating zone when the heating zone's heating demand has not been satisfied within the delay period or has just gone to occupied.

After the secondary heating flag has been set in step 178, the controller proceeds to the secondary heating control sub-routine 180, as illustrated in FIG. 4. Referring now to FIG. 9, the secondary heating sub-routine initially determines whether any of the zones that are designated as a forced air and radiant (FAR) zone requires secondary heat, based upon the secondary heat flag set in step 178 of FIG. 8. If the controller determines in block 182 that one of the FAR zones requires secondary heat, the controller 16 activates the secondary heat source, as illustrated in step 184.

Next, for each FAR zone, the controller opens the damper for the zone requiring secondary heat and closes the remaining dampers that do not require secondary heat, as illustrated in step 186. For zones designated as radiant-only (R), the controller opens the damper for the zone. If either zone one or two requires secondary heat, the controller energizes the supplemental heating system 50, as illustrated in FIG. 2, to provide additional heating to this zone, as illustrated in step 188.

The controller 16 then determines whether secondary heat is still needed for the heating zone that initially required the secondary heat, as illustrated in step 190. If secondary heat is no longer required, the controller continues to run a five minute timer that ensures that the primary heat remains on for at least five minutes after the secondary heat has been removed, as illustrated in step 192. However, if in step 190 the controller then determines that secondary heat is still required, the five minute timer is reset, as illustrated in block 194. In this manner, the five minute timer ensures that primary heat is supplied to the zone for five minutes after the secondary heat has been turned off for that particular zone.

Referring back to step 182, if the controller determines that no FAR zone requires secondary heat, the controller 16 next determines whether any radiant-only zone requires secondary heat in step 195. If none of the R-only zones requires secondary heat, the controller 16 turns off the heat demand of the forced air HVAC system and any baseboard supplemental heat 50. A two minute timer allows the dampers to remain open to dissipate the heat of the forced air system. After step 196, the controller returns to step 190 to determine when the last time that secondary heat was needed.

Referring back to step 195, if the controller determines that a radiant-only (R) zone requires secondary heat, all of the dampers are opened in step 197 and the activation signal is turned off for the forced air secondary heating system. Since the zone requiring secondary heat is radiant-only and cannot receive the forced air secondary heat, the controller terminates the actuation signal and the secondary heating system is inactivated.

Next, the controller determines if either zone 1 or 2 require secondary heat and the controller energizes the supplemental heating system 50, as illustrated in FIG. 2, to provide additional heating to this zone, as illustrated in step 199. Following step 199, the controller returns to step 190 to determine whether secondary heat was needed previously, as discussed above.

Referring back to FIG. 4, after the secondary heating control function is completed, the controller begins the humidity sub-routine, as illustrated in step 198. The humidity sub-routine is illustrated in detail in FIG. 10.

Initially, the controller determines whether any of the zones are currently in the cooling mode, as illustrated in step 200. If the controller is currently in the cooling mode, humidity cannot be supplied and the humidifier is de-energized in step 202, the fans are turned off and the dampers opened in step 204 and the controller returns back to the main operating sub-routine.

However, if the controller is currently not in the cooling mode, the controller determines whether at least one of the zones is designated as an FAR zone, as illustrated in step 206. If none of the zones are designated as an FAR zone, humidity cannot be added since no zone is serviced by the forced air system. If no zone is designated as an FAR zone, the controller carries out steps 202 and 204 and returns to the main operating routine.

If the controller is not in the cooling mode, the controller then determines whether the humidistat 54 connected to the terminal block 55 is calling for humidity in step 208. If the humidistat 54 is calling for humidity, the controller then determines whether the controller is currently in the heat mode, as illustrated in step 210. If the controller is currently in the heat mode, the forced air HVAC system is currently on, which means that the circulating fan is active and air is being supplied through the forced air system. Thus, the controller simply activates the humidifier in step 212. Since the forced air system is currently operating, the controller can turn on the humidifier to supply humidity to the residence without taking any further steps.

If in step 210 the controller determines that it is currently not in the heat mode, the controller determines whether the occupancy switch 86 has been set to indicate the residence is unoccupied, as shown in step 214. If the residence is unoccupied, the humidifier is de-energized in step 202 and the fans turned off in step 204 and the controller returns back to the main operating routine. However, if the residence is occupied, as determined in step 214, the controller energizes the circulating fan in step 216 and energizes the humidifier in step 218.

The final sub-routine in the main operational sequence is the output function illustrated by step 242 in FIG. 4. The output sub-routine, as shown in detail FIG. 11, initially determines whether the cooling or humidity algorithm want the fan on or, if in the NEITHER mode, at least one zone is calling for a fan, as illustrated in block 244. If neither the cooling or humidity algorithms want the fan on, the fan is turned off in block 246. If, in block 244, it is determined that the fan needs to be on, the fan is turned on in block 245.

After controlling the fan in steps 245 and 246, the controller determines the current operating mode in step 247. If the operating mode is set to COOL, the controller next determines whether the cooling algorithm has indicated that it needs control of the dampers in step 248. If the cooling algorithm requires control of the dampers, the controller utilizes the cooling algorithm of FIG. 7 and the selection of the zones as being either forced air and radiant (FAR) or radiant-only (R) to control the position of the dampers, as illustrated in block 249.

If the cooling algorithm indicates that it does not need control of the dampers, the controller checks the output of an OR gate to determine if any zone requires cooling. If a FAR zone is calling for cooling, the damper for that zone is closed and all others opened. At the same time, the dampers for the radiant-only (R) zones are opened. If the output of the OR gate is not active, all of the dampers are opened.

Figure 8:
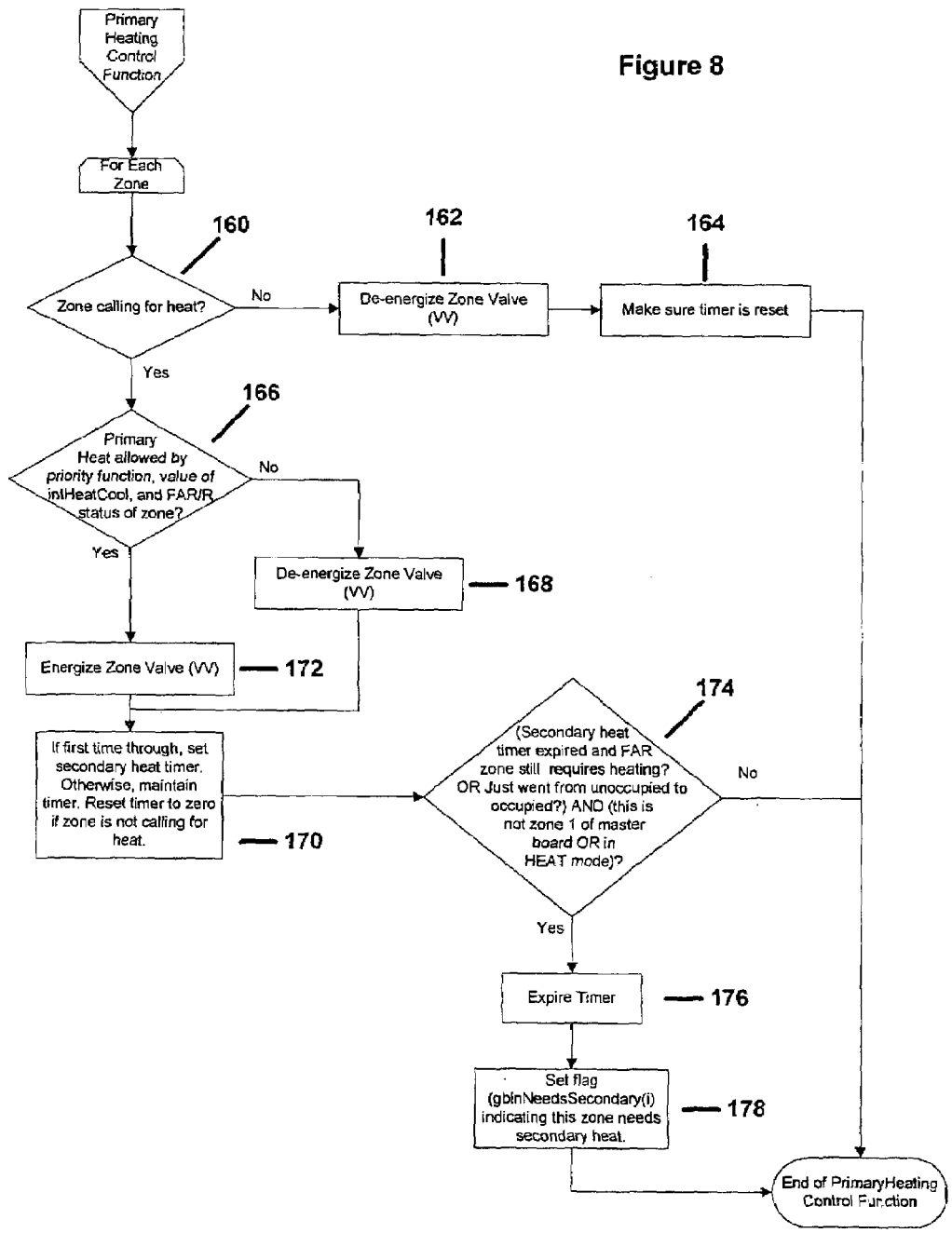
FIG. 8 is a flow chart illustrating the primary heating control sub-routine performed by the controller of the present invention.
Figure 9:
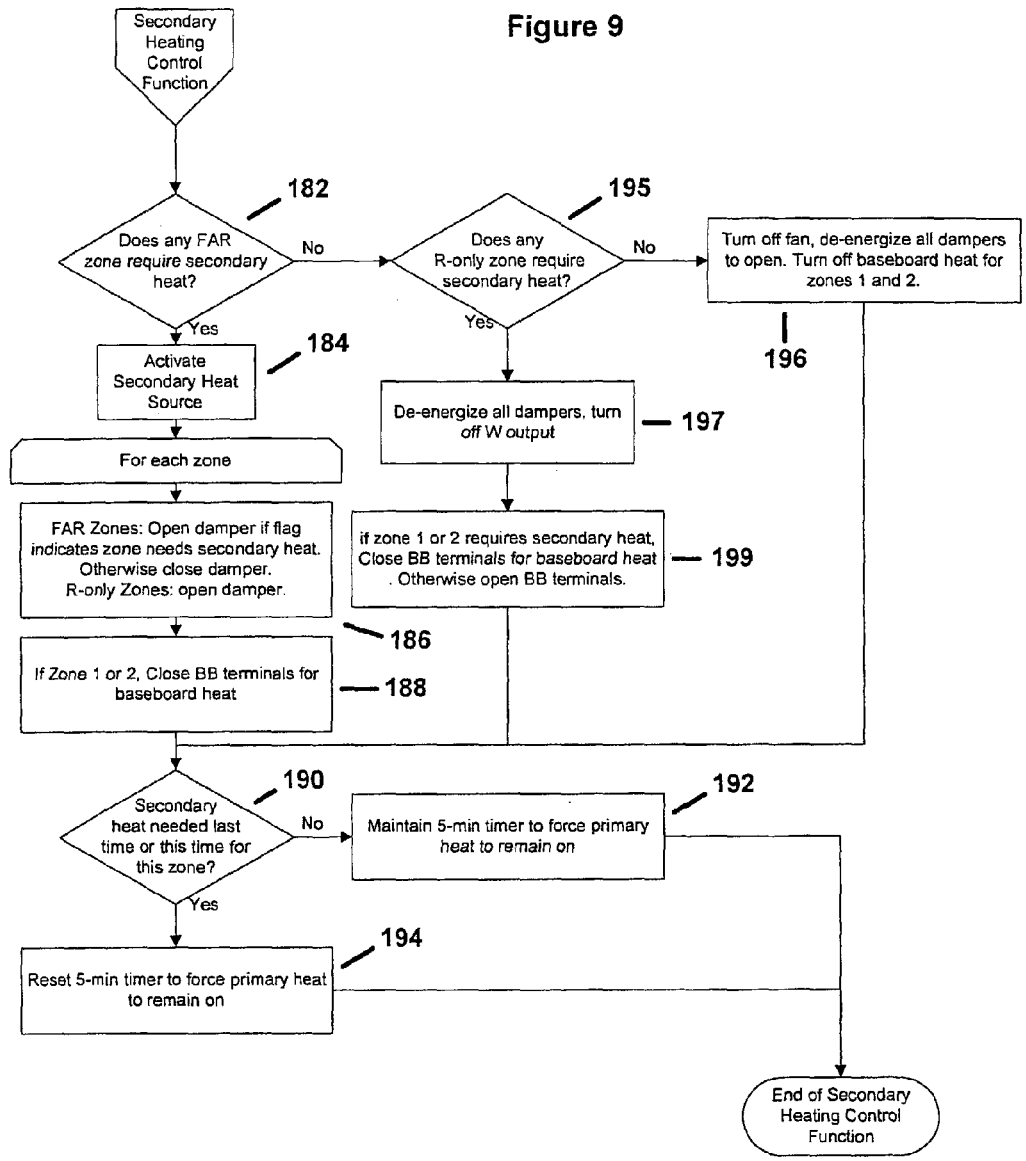
FIG. 9 is a flow chart illustrating the secondary heating control sub-routine performed by the controller of the present invention.
Figure 10:
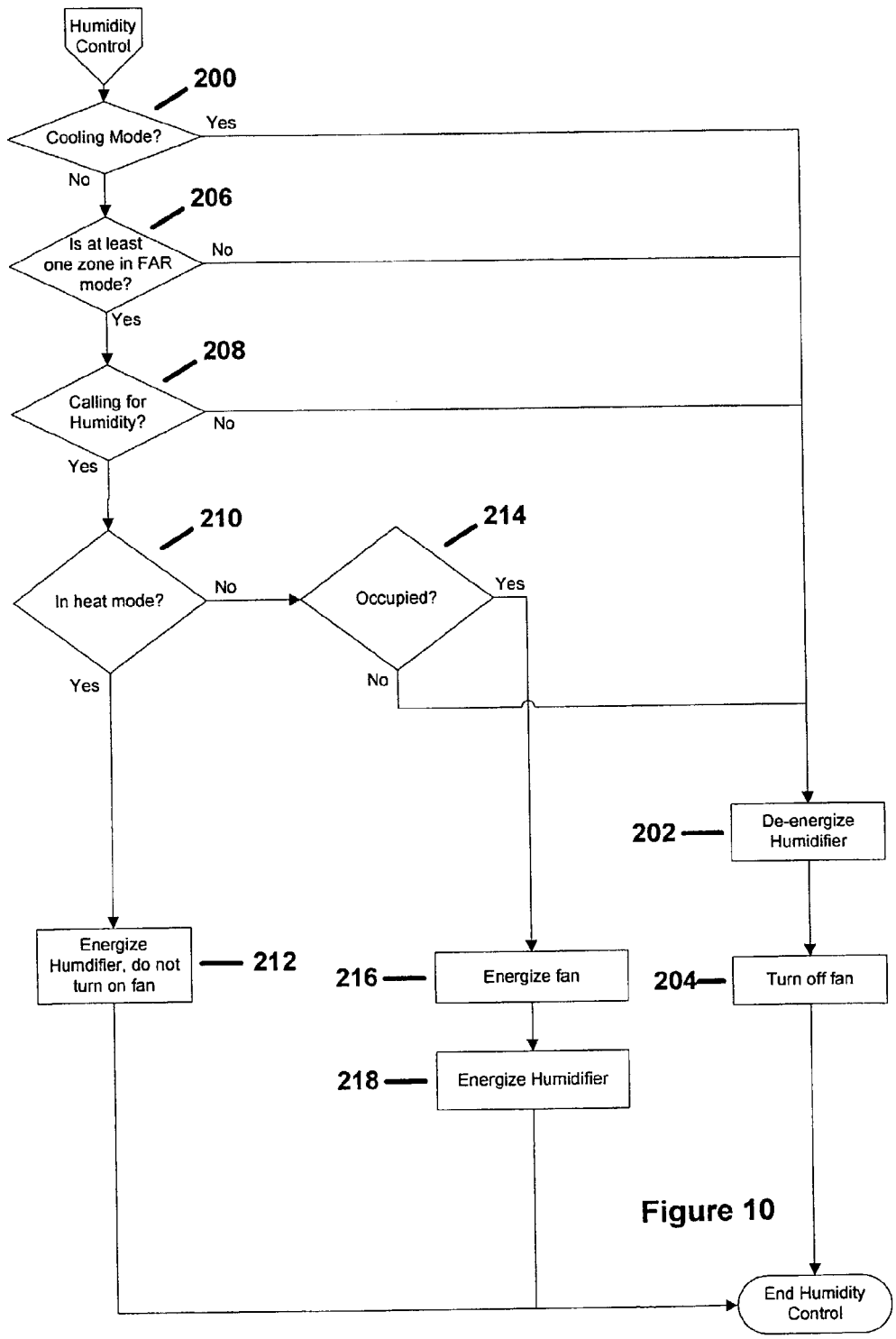
FIG. 10 is a flow chart illustrating the humidity control sub-routine performed by the controller of the present invention.
Figure 11:
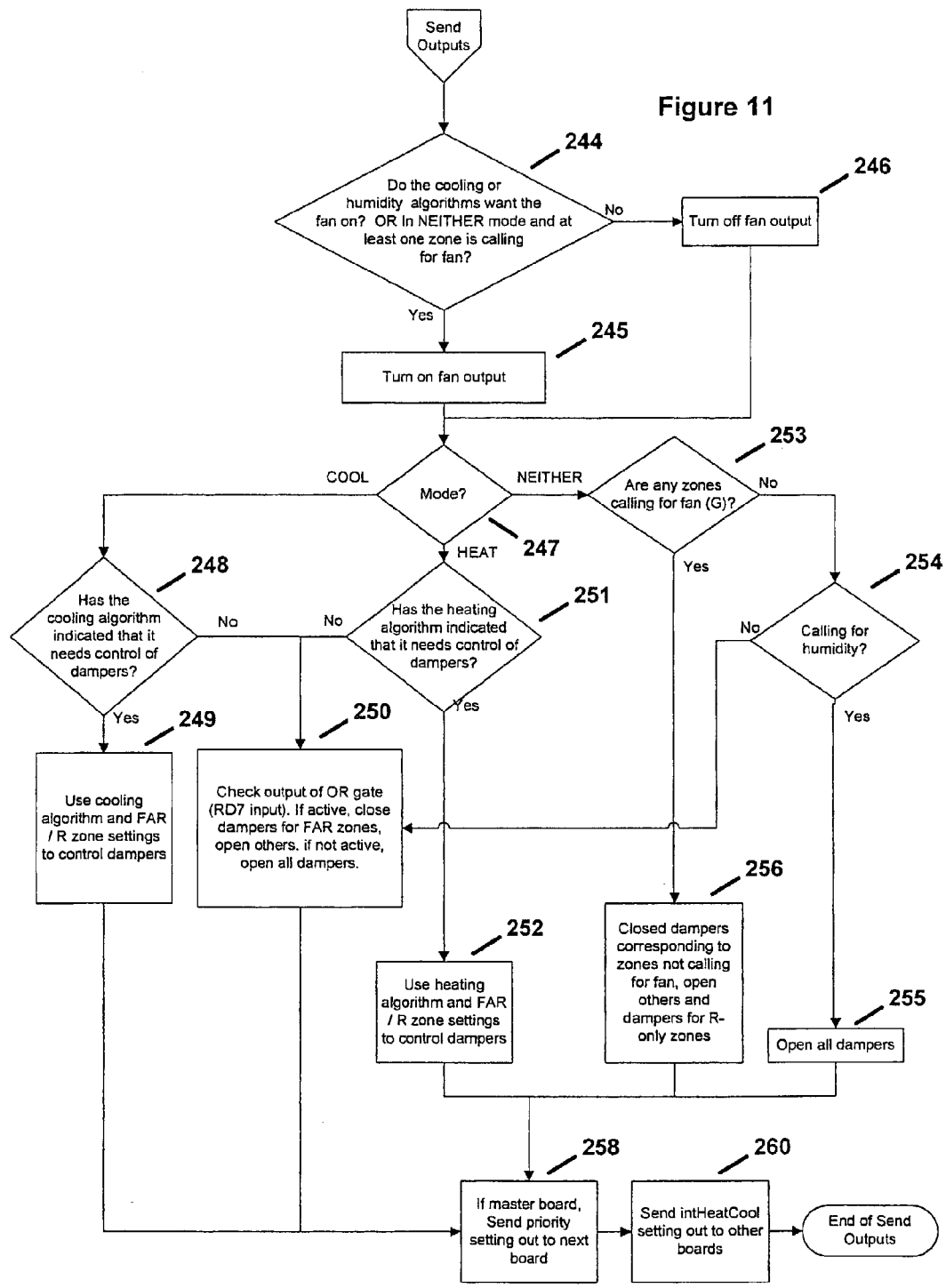
FIG. 11 is a flow chart illustrating the output function performed by the controller of the present invention.

If the controller determines in block 247 that the controller is currently in the heat mode, the controller next determines whether the heating algorithm of FIG. 8 indicates that it needs control of the dampers, as illustrated in block 251. If the heating algorithm indicates a need for damper control, the heating algorithm and the FAR and R-only zone settings are used to control the damper, as illustrated in step 252.

Returning back to block 247, if the controller determines that it is currently in neither the cooling or heating mode, the controller determines whether any zones are calling for the fan in step 253. If no zones are calling for a fan, the controller then determines whether any zones are calling for humidity in step 254. If any of the zones are calling for humidity, the controller opens all of the dampers in step 255 such that upon the next call for heat, humidity will be supplied to the zones.

Referring back to block 254, if no zone is calling for humidity, the controller returns to step 250 as illustrated.

Referring back to block 253, if one of the zones is calling for the fan, the dampers are closed for zones not calling for the fan and opened for any zones requesting the fans, including any zones designated as a radiant-only zone, as illustrated in step 256.

When either controlling functions 246, 250, 256, or 254 is completed then, the controller sends the priority setting out to the next control unit, 16a–16c in step 258 and sends the heat/cool flag to the controllers 16a–16c in step 260. After completion of step 260, the controller returns to step 81 in FIG. 4 and begins the process again. As illustrated in step 81, the entire process is repeated every ten seconds.

As the above description indicates, the controller 16 of the present invention is able to simultaneously control and operate a radiant heating system and a forced air HVAC system in order to provide both cooling, heating, and humidity to a zoned residence. Specifically, the controller is able to supplement the primary, radiant heating system with heat from the secondary forced air heating system when the radiant heating system is unable to meet heating demands for each zone within a selected time period. In this manner, the controller of the present invention is able to supplement the radiant heating system with the forced air system, which optimizes the heating capability of the combined systems.

Various alternatives and embodiments are contemplated as being within the scope of the following claims particularly pointing out and distinctly claiming the subject matter regarded as the invention.

I claim:

1. A method of controlling the operation of a zoned climate control system having a primary radiant heating system, a secondary forced air heating system and a cooling unit, the zoned climate control system having a plurality of individual zones, each individual zone having a thermostat that generates a heating demand signal and a cooling demand signal based upon user selectable temperature parameters, the method of comprising the steps of:
providing at least one controller for the zoned climate control system, the controller being operatively connected to the primary radiant heating system, the secondary forced air heating system and the cooling unit;
designating in the controller whether each zone is a radiant-only zone or a forced air and radiant zone;
monitoring for the generation of a heating demand signal or a cooling demand signal from any one of the zone thermostats;
determining whether the controller is currently activating the cooling unit upon receipt of a demand for heat from one of the individual zones;
preventing the supply of heat to any of the zones designated as a forced air and radiant zone when the controller is currently activating the cooling unit; and
allowing the supply of heat to any of the zones designated as a radiant-only zone when the controller is currently activating the cooling unit.

2. The method of claim 1 further comprising the steps of:
determining whether the heating demand signal is being generated from one of the zones designated as a forced air and radiant zone;
providing heat from the primary radiant heating system to the individual zone upon the controller receiving a demand for heat from the individual zone;
monitoring the duration of time that heat is supplied to the individual zone demanding heat by the primary radiant heating system;
comparing the duration of time that heat is supplied from the primary radiant heating system to the individual zone to a predetermined maximum heating period; and
providing heat from the secondary forced air heating system to the individual zone only if the individual zone has been designated as a forced air and radiant zone when the continuous amount of time that heat is supplied to the individual zone by the primary radiant heating system exceeds the maximum heating period.

3. The method of claim 2 further comprising the steps of:
interconnecting a plurality of controllers, each controller being operable to control the supply of heat from the primary radiant heating system and the secondary forced air heating system to a set of the plurality of zones, wherein the interconnected controllers control the supply of heat to the plurality of zones;
designating one of the control units as a master controller, the master controller controlling the supply of heat to a priority zone, wherein when the master controller is supplying heat to the priority zone, the interconnected controllers prevent heat from being supplied to the remaining zones.

4. The method of claim 3 further comprising the steps of:
monitoring the continuous amount of time that heat is supplied from the primary radiant heating system to the priority zone by the master controller;
comparing the continuous amount of time that heat is supplied to the priority zone to a maximum priority heating period; and
deactivating the priority function of the priority zone if the priority time has exceed a maximum amount of time.

5. The method of claim 1 wherein the secondary forced air heating system and the cooling unit are a forced air HVAC system having a plurality of zone dampers that control the flow of heated or cooled air from the forced air HVAC system to each of the zones.

6. The method of claim 5 wherein the step of providing heat from the secondary forced air heating system includes activating the forced air HVAC system and opening the damper for the individual zone generating a heating demand signal.

7. The method of claim 6 further comprising the steps of:
monitoring for the generation of a humidity signal from one of the individual zones, the humidity signal indicating a demand for humidity; and
activating a humidifier contained in the forced air HVAC system to supply humidity to at least the zone generating the humidity signal.

8. The method of claim 5 further comprising the steps of:
activating the cooling unit upon the controller receiving a demand for cooling from the one of the zones; and opening the damper for the individual zone to supply cooled air from the cooling unit to the zone while closing the dampers for each of the other zones.

9. A method of controlling operation of a zoned climate control system having a primary radiant heating system, a secondary forced air heating system, and a cooling unit, the zoned climate control system having a plurality of individual zones each having a zone thermostat, the method comprising the steps of:

providing at least one controller for the zoned climate control system, and designating in the controller whether each zone is a radiant-only zone or a forced air and radiant zone;

monitoring for the generation of a heating demand signal from any one of the zone thermostats;

upon generation of a heating demand signal from any one of the zone thermostats, opening a zone valve or circulator for the individual zone generating the heating demand signal to provide heat from the primary radiant heating system to the individual zone generating the heating demand signal;

monitoring the duration of time that heat is supplied to the individual zone demanding heat by the primary radiant heating system;

comparing the duration of time that heat is supplied from the primary radiant heating system to the individual zone demanding heat to a predetermined maximum heating period;

opening a zone damper for the individual zone generating the heating demand signal only if the individual zone is designated as a forced air and radiant zone to provide heat from the secondary forced air heating system to the individual zone demanding heat when the duration of time that heat is supplied to the individual zone demanding heat by the primary radiant heating system exceeds the maximum heating period.

10. The method of claim 9 wherein the step of providing heat from the secondary forced air heating system includes activating the forced air heating system and opening the zone damper for the individual zone generating the heating demand signal and closing the zone damper for each of the other individual zones not generating a heating demand signal.

11. The method of claim 9 further comprising the steps of:

monitoring for the generation of a humidistat, humidity signal by the humidity signal indicating a demand for humidity; and upon generation of heating demand signal from any one of the zone thermostats, activating a humidifier to supply humidity to at least the individual zone generating the humidity signal.

12. The method of claim 9 further comprising the step of providing a single controller coupled to the primary radiant heating system, the secondary forced air heating system, and the zone thermostats, the controller being operable to control the operation of the primary radiant heating system including the plurality of zone valves and the secondary forced air heating system including the plurality of zone dampers.

13. The method of claim 9 further comprising the steps of:

activating a cooling unit upon the controller receiving a demand for cooling from one of the individual zones designated as a forced air and radiant zone; and opening the damper for the individual zone to supply cooled air from the cooling unit to the individual zone generating the cooling demand signal while closing the dampers for each of the other individual zones.

14. The method of claim 13 further comprising the steps of:

determining whether the controller is currently activating the cooling unit upon receipt of a demand for heat from one of the individual zones;

preventing the supply of heat to any of the zones designated as a forced air and radiant zone when the controller is currently activating the cooling unit;

allowing the supply of heat from the primary radiant heating system to any of the zones designated as a radiant only zone when the controller is currently activating the cooling unit.

* * * * *